(12) United States Patent
Iida et al.

(10) Patent No.: US 7,859,579 B2
(45) Date of Patent: Dec. 28, 2010

(54) RECORDING AND REPRODUCING DEVICE AND RECORDING AND REPRODUCING METHOD

(75) Inventors: Kenichi Iida, Saitama (JP); Izuru Tanaka, Kanagawa (JP); Eiichi Yamada, Tokyo (JP); Fumihiko Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 644 days.

(21) Appl. No.: 11/214,745

(22) Filed: Aug. 31, 2005

(65) Prior Publication Data

US 2006/0045487 A1    Mar. 2, 2006

(30) Foreign Application Priority Data

Sep. 2, 2004    (JP)    ............................. 2004-256199

(51) Int. Cl.
    *H04N 5/76*    (2006.01)
(52) U.S. Cl. ................................. 348/231.3; 348/231.4
(58) Field of Classification Search ............. 348/231.4, 348/231.2, 333.02, 231.3
    See application file for complete search history.

(56) References Cited

U.S. PATENT DOCUMENTS

| | | | | |
|---|---|---|---|---|
| 5,262,877 A | * | 11/1993 | Otsuka | 386/54 |
| 5,784,525 A | * | 7/1998 | Bell | 386/107 |
| 5,812,736 A | * | 9/1998 | Anderson | 386/96 |
| 5,861,918 A | * | 1/1999 | Anderson et al. | 348/231.9 |
| 5,933,137 A | * | 8/1999 | Anderson | 715/720 |
| 5,982,981 A | * | 11/1999 | Satoh | 386/107 |
| 6,111,604 A | * | 8/2000 | Hashimoto et al. | 348/220.1 |
| 6,226,449 B1 | * | 5/2001 | Inoue et al. | 386/120 |
| 6,661,454 B1 | * | 12/2003 | Hwang et al. | 348/231.1 |
| 6,774,939 B1 | * | 8/2004 | Peng | 348/231.4 |
| 6,778,760 B1 | * | 8/2004 | Kagle | 386/96 |
| 6,791,601 B1 | * | 9/2004 | Chang et al. | 348/65 |
| 6,965,403 B2 | * | 11/2005 | Endo | 348/231.2 |
| 7,058,286 B2 | * | 6/2006 | Ejima et al. | 386/95 |
| 7,098,946 B1 | * | 8/2006 | Koseki et al. | 348/229.1 |
| 7,106,369 B2 | * | 9/2006 | Baron | 348/231.4 |

(Continued)

FOREIGN PATENT DOCUMENTS

JP    62-77623    4/1987

(Continued)

OTHER PUBLICATIONS

U.S. Appl. No. 11/020,504, filed Aug. 17, 2005.

(Continued)

*Primary Examiner*—Jason Chan
*Assistant Examiner*—Gary C Vieaux
(74) *Attorney, Agent, or Firm*—Oblon, Spivak, McClelland, Maier & Neustadt, L.L.P.

(57) ABSTRACT

A portable type recording and reproducing device including recording means for converting sound information output from sound collecting means to files in message units and recording the files on a predetermined recording medium, and recording image information output from photographing means on the recording medium in association with a corresponding file of sound information in response to a first external operation, display means for displaying images based on image information associated with respective files of sound information, and reproducing means for reproducing a file of sound information associated with an image selected by a predetermined second external operation among the images displayed by the display means.

17 Claims, 13 Drawing Sheets

U.S. PATENT DOCUMENTS

| | | | |
|---|---|---|---|
| 7,106,375 B2 * | 9/2006 | Venturino et al. | 348/333.02 |
| 7,154,535 B2 * | 12/2006 | Yamasaki et al. | 348/207.1 |
| 7,180,540 B2 * | 2/2007 | Son | 348/231.4 |
| 7,265,782 B2 * | 9/2007 | Iijima | 348/231.4 |
| 7,358,990 B2 * | 4/2008 | Morino | 348/231.2 |
| 7,411,623 B2 * | 8/2008 | Shibutani | 348/333.02 |
| 2001/0005442 A1 * | 6/2001 | Ueda et al. | 386/46 |
| 2002/0021361 A1 * | 2/2002 | Kitajima et al. | 348/232 |
| 2002/0140826 A1 * | 10/2002 | Sato et al. | 348/222.1 |
| 2004/0111436 A1 * | 6/2004 | Nagai et al. | 707/104.1 |
| 2004/0143601 A1 * | 7/2004 | Shinozaki | 707/104.1 |
| 2004/0167783 A1 * | 8/2004 | Nagai | 704/270 |

FOREIGN PATENT DOCUMENTS

| | | | |
|---|---|---|---|
| JP | 6-276478 | | 9/1994 |
| JP | 06276478 A | * | 9/1994 |
| JP | 2001-69453 | | 3/2001 |
| JP | 2001-358980 | | 12/2001 |

OTHER PUBLICATIONS

U.S. Appl. No. 11/212,810, filed Aug. 29, 2005.
U.S. Appl. No. 11/216,058, filed Sep. 1, 2005.
U.S. Appl. No. 11/210,862, filed Aug. 25, 2005, Iida, et al.
U.S. Appl. No. 11/212,692, filed Aug. 29, 2005, Iida, et al.
U.S. Appl. No. 11/213,879, filed Aug. 30, 2005, Iida, et al.

* cited by examiner

FIG. 4A    FIG. 4B
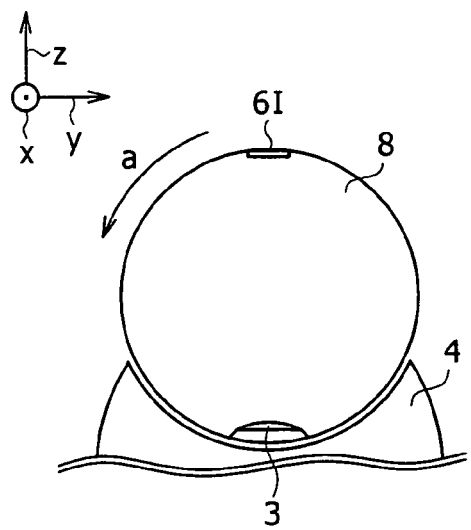
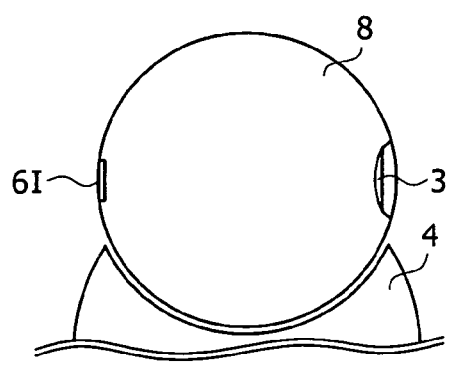
FIG. 4C
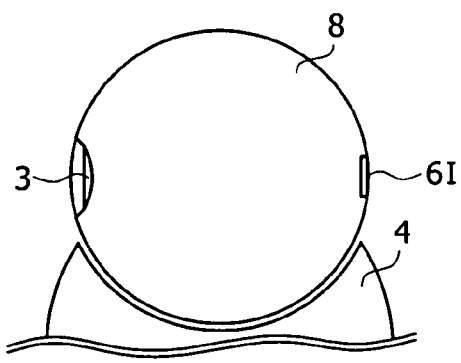

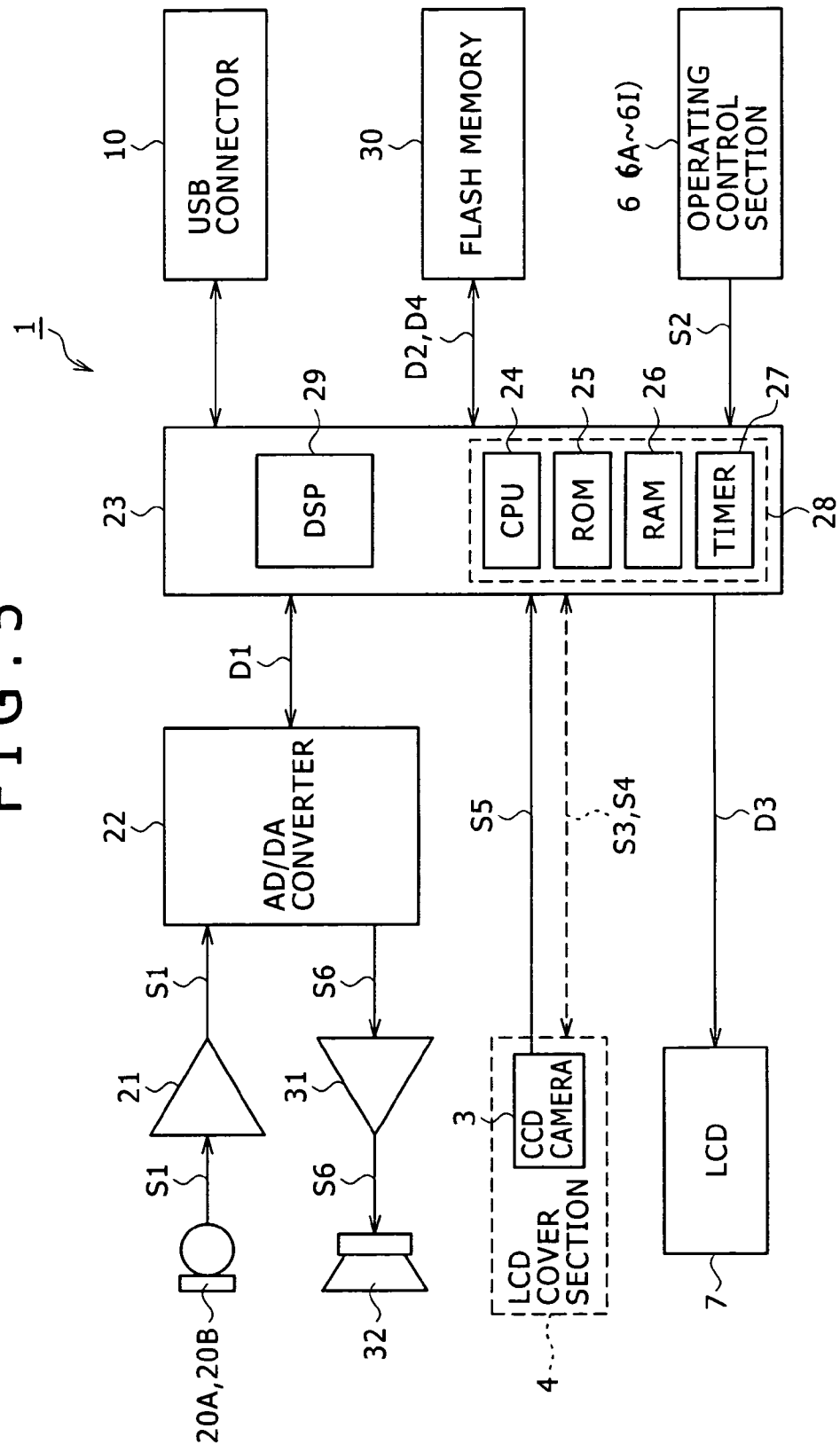

RECORDING AND REPRODUCING DEVICE AND RECORDING AND REPRODUCING METHOD

BACKGROUND OF THE INVENTION

The present invention relates to a recording and reproducing device and a recording and reproducing method, and is suitable for application to an IC (Integrated Circuit) recorder with a camera, for example.

Conventionally, there is an IC recorder as a portable type sound recording and reproducing device. This IC recorder collects external sound by a built-in microphone, subjects sound data obtained to a compression coding process, and records resulting data in a built-in semiconductor memory or an external memory such as a Memory Stick (a registered trademark of Sony Corporation) or the like loaded in the IC recorder.

Such an IC recorder has a small size and a light weight and is excellent in portability. Therefore, recently, the IC recorder has been used at meetings or in making arrangements, for example, on a business scene, and has also been widely used on other than the business scene as a sound memo device for personal use.

SUMMARY OF THE INVENTION

When a desired sound file among sound files recorded and stored in the conventional IC recorder is to be reproduced, the IC recorder first requires an operation of searching for the desired sound file on the basis of file names of sound files displayed on an LCD (Liquid Crystal Display) disposed in one part of a casing of the IC recorder.

In this case, the file names of the sound files displayed on such an LCD are serial numbers automatically given by the IC recorder immediately after recording, character strings formed by combining numbers and alphabetical letters, or keywords registered by a user after recording. However, it is often difficult to associate only a file name with contents of the sound file. Therefore a method of searching for a desired sound file while reproducing each sound file in order, and checking contents on the basis of reproduced sound is normally performed.

However, according to this method, when there are a large number of sound files of similar contents as in a case where for example contents of a meeting are recorded continually, and it is not known at which part in which sound file among the sound files contents to be checked are recorded, a considerable effort and time is required before the desired sound part of the desired sound file is finally found.

It is thus considered that when the IC recorder enables quick and easy search for a desired sound file among recorded and stored sound files, an effort and time required for the search is reduced and ease of use can be improved greatly.

The present invention has been made in view of the above points, and it is desirable to propose a recording and reproducing device that can improve ease of search for a recorded and stored sound file and greatly improve ease of use.

According to an embodiment of the present invention, there is provided a portable type recording and reproducing device including: recording means for converting sound information output from sound collecting means to files in message units and recording the files on a predetermined recording medium, and recording image information output from photographing means on the recording medium in association with a corresponding file of sound information in response to a first external operation; display means for displaying images based on image information associated with respective files of sound information; and reproducing means for reproducing a file of sound information associated with an image selected by a predetermined second external operation among the images displayed by the display means.

As a result, the recording and reproducing device enables a user to search intuitively for a desired file of sound information among files of sound information recorded and stored on the recording medium on the basis of images displayed by the display means.

In addition, according to an embodiment of the present invention, there is provided a recording and reproducing method including: a first step for converting sound information obtained by collecting external sound to files in message units and recording the files on a predetermined recording medium, and recording image information obtained by photographing an outside on the recording medium in association with a corresponding file of sound information in response to a predetermined first external operation; a second step for displaying images based on image information associated with respective files of sound information; and a third step for reproducing a file of sound information associated with an image selected by a predetermined second external operation among the displayed images.

As a result, the recording and reproducing method enables a user to search intuitively for a desired file of sound information among files of sound information recorded and stored on the recording medium on the basis of displayed images.

In the recording and reproducing device and the recording and reproducing method according to the embodiments of the present invention, sound information obtained by collecting external sound is converted to files in message units and the files are recorded on a predetermined recording medium, and image information obtained by photographing an outside is recorded on the recording medium in association with a corresponding file of sound information in response to a predetermined first external operation, images based on image information associated with respective files of sound information are displayed, and a file of sound information associated with an image selected by a predetermined second external operation among the displayed images is reproduced. It is thereby possible for a user to intuitively search for a desired file of sound information among files of sound information recorded and stored on the recording medium on the basis of images displayed by the display means. Thus, a recording and reproducing device and a recording and reproducing method can be realized which make it possible to improve ease of search for a desired file of sound information and thus greatly improve ease of use.

BRIEF DESCRIPTION OF THE DRAWINGS

FIGS. 4A, 4B, and 4C are schematic diagrams of assistance in explaining rotational states of a camera cover;

FIG. 5 is a block diagram showing an internal configuration of the IC recorder with the camera according to the present embodiment;

DETAILED DESCRIPTION OF THE PREFERRED EMBODIMENT

One embodiment of the present invention will hereinafter be described in detail with reference to the drawings.

(1) Structure of IC Recorder 1 with Camera According to Present Embodiment

Figure 1:
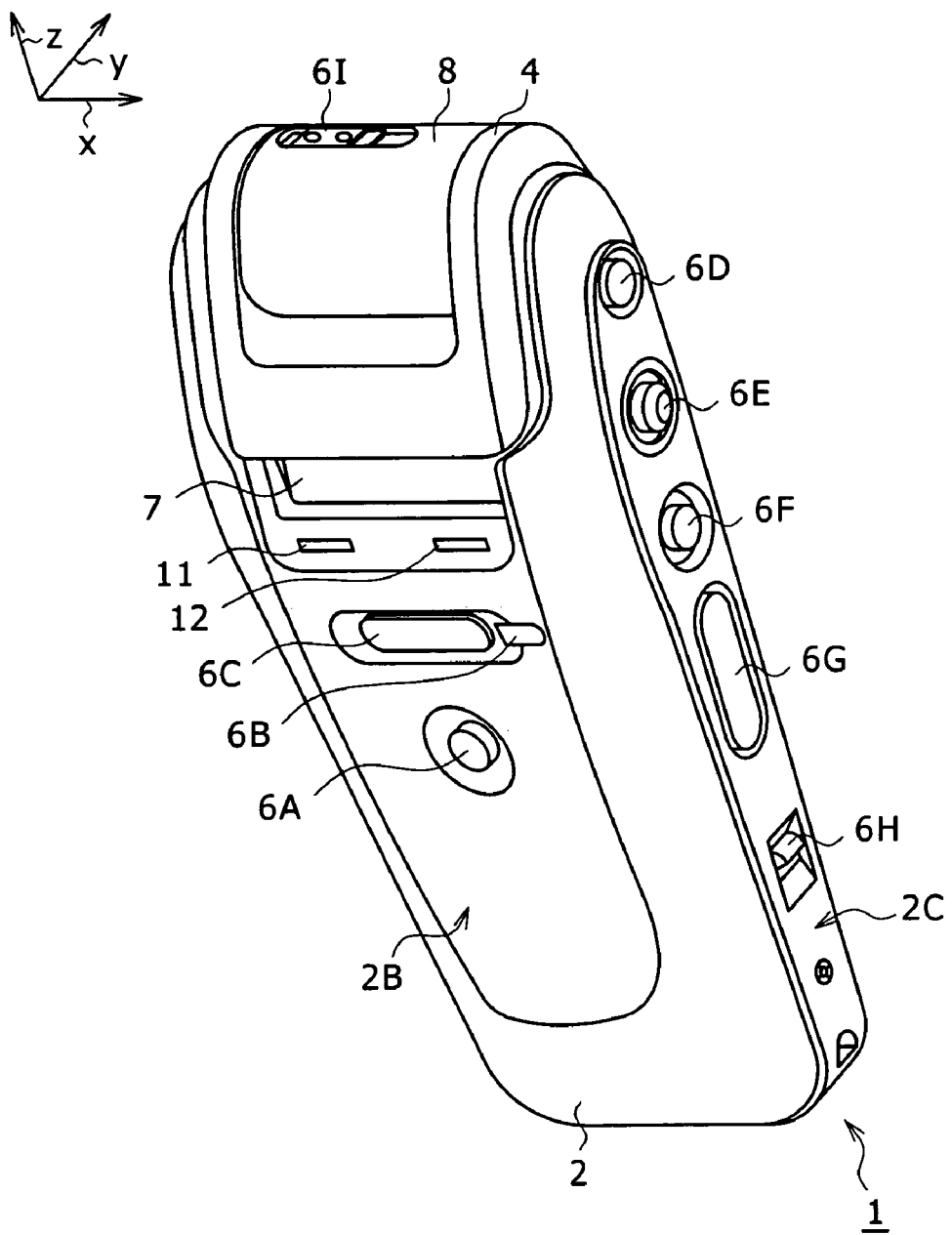
FIG. 1 is a perspective view of an external structure of an IC recorder with a camera according to a present embodiment when an LCD cover section is in a closed state.
Figure 2:
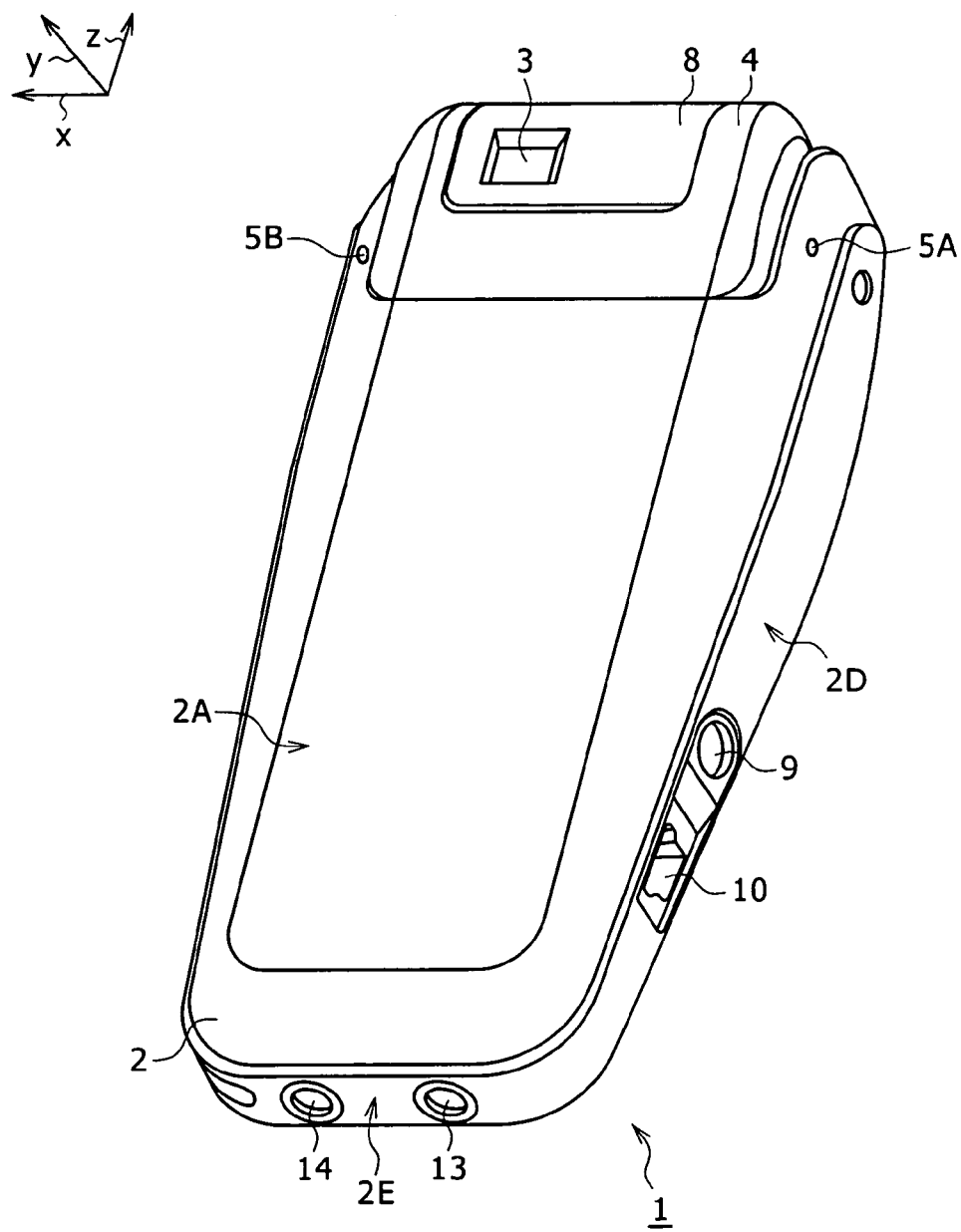
FIG. 2 is a perspective view of an external structure of the IC recorder with the camera according to the present embodiment when the LCD cover section is in the closed state.
Figure 3:
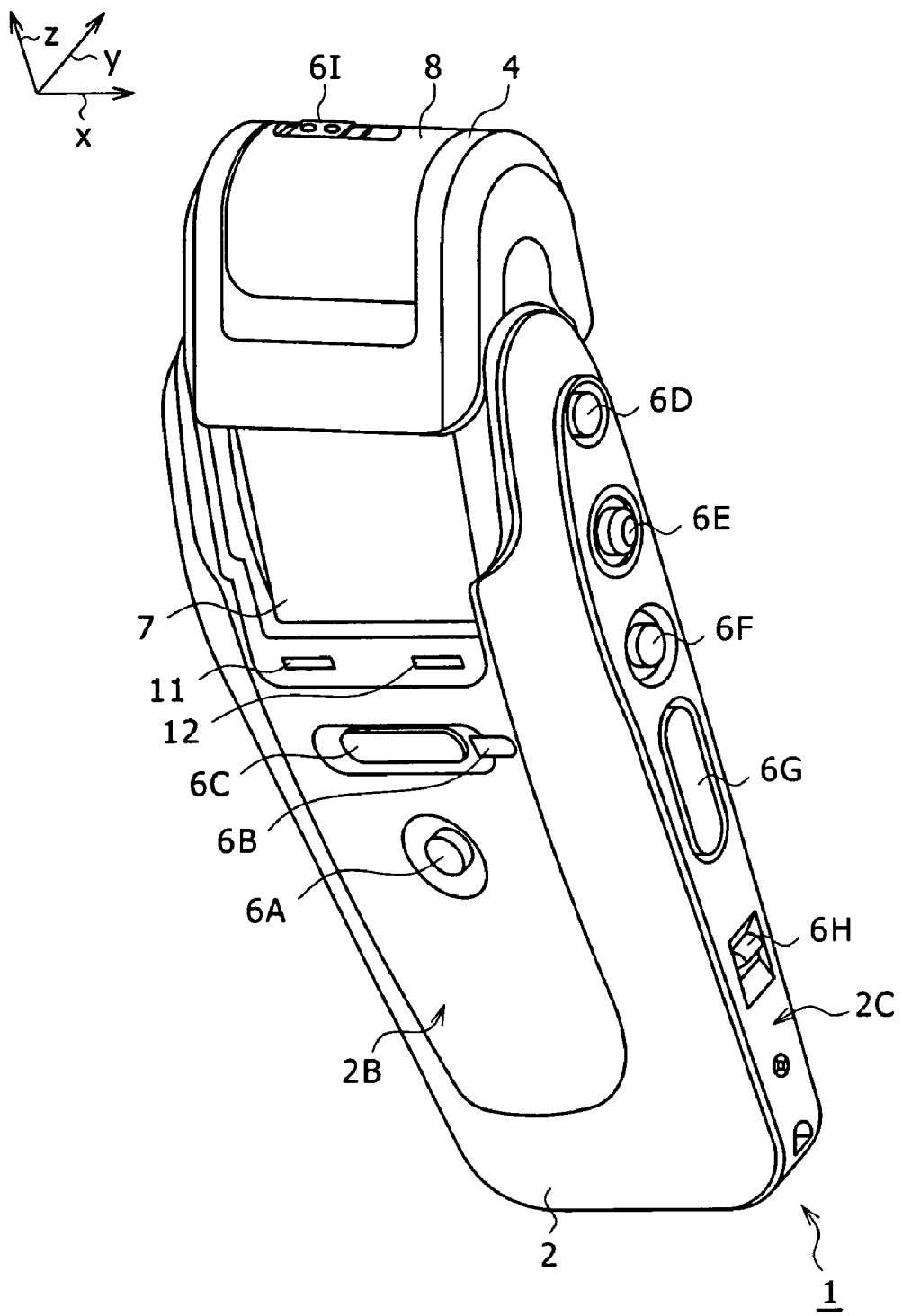
FIG. 3 is a perspective view of an external structure of the IC recorder with the camera according to the present embodiment when the LCD cover section is in an open state.

In FIGS. 1 to 3, reference numeral 1 denotes an IC recorder with a camera according to the present embodiment as a whole. An LCD cover section 4 to which a CCD (Charge Coupled Device) camera 3 is attached is disposed so as to be slidable in an upward direction (direction of an arrow z), on an upper part of a main body part 2 that is rounded as a whole and vertically long.

Sound collecting holes 5A and 5B are made on both a left side and a right side of an upper part of a back surface 2A of the main body part 2, and microphones 20A and 20B (FIG. 5) are housed within the main body part 2 in such a manner as to correspond to these sound collecting holes. Thus, these microphones 20A and 20B can collect external sound via the corresponding sound collecting holes 5A and 5B.

A recording button 6A is disposed at a middle position of a front surface 2B of the main body part 2. Pressing the recording button 6A can start an operation of recording the external sound collected by the microphones 20A and 20B.

Further, an LCD 7 formed by a high-resolution color liquid crystal display is disposed at an upper position of the front surface 2B of the main body part 2, as shown in FIG. 3. A live view button 6B is disposed below the LCD 7. By pressing the live view button 6B when the LCD cover section 4 is set in an open state by being pulled out in the upward direction as shown in FIG. 3, and a camera cover 8 of the LCD cover section 4 is set in an open state by being rotated so as to expose the CCD camera 3 as later described, a moving image taken by the CCD camera 3 at that time can be displayed on the LCD 7.

A camera shutter button 6C is disposed on a left side of the live view button 6B at the middle position of the front surface 2B of the main body part 2. By pressing the camera shutter button 6C in a state of a moving image being displayed on the LCD 7, a still image for one frame at a moment when the camera shutter button 6C is pressed can be captured from the moving image displayed on the LCD 7, and stored. Thus, the IC recorder 1 with the camera makes it possible to record a desired still image while visually checking a moving image displayed on the LCD 7.

On the other hand, a menu button 6D is provided on a right side surface 2C of the main body part 2. By pressing the menu button 6D, a predetermined menu screen can be displayed on the LCD 7. In addition, a jog lever 6E is disposed under the menu button 6D on the right side surface 2C of the main body part 2. By operating the jog lever 6E such that the jog lever 6E is tilted in an upward direction, a downward direction, a left direction, or a right direction, or pressing the jog lever 6E, a desired alternative can be selected from among various alternatives displayed within a menu screen, or the alternative can be set as a selected object.

Further, a stop button 6F is disposed under the jog lever 6E on the right side surface 2C of the main body part 2, and a volume button 6G is disposed under the stop button 6F. Pressing the stop button 6F can stop recording operation or reproducing operation. Pressing an upper side or a lower side of the volume button 6G during reproducing operation can raise or lower the volume of reproduced sound output from a speaker 32 (FIG. 5) provided on the back side of the LCD 7 at this time.

Further, a voice-up switch 6H is disposed under the volume button 6G on the right side surface 2C of the main body part 2. When the voice-up switch 6H is set in an on state during reproducing operation, sound recorded at a low volume level can be output at a high volume level while the volume of sound recorded at a high volume level at the time of recording operation is maintained as it is.

On the other hand, a power supply connector 9 is disposed on a left side surface 2D of the main body part 2. By inserting a plug of a power supply kit into the power supply connector 9, power supply voltage can be supplied to the IC recorder 1 with the camera, or a battery not shown in the figure included in the IC recorder 1 with the camera can be charged.

In addition, a USB (Universal Serial Bus) connector 10 is disposed under the power supply connector 9 on the left side surface 2D of the main body part 2. The IC recorder 1 with the camera can be USB-connected to an external device such as a personal computer or the like via the USB connector 10. Thus, the IC recorder 1 with the camera can output sound data of recorded sound and image data of recorded images stored in the IC recorder 1 with the camera to the USB-connected external device, and capture sound data and image data supplied from the external device.

Incidentally, a charging LED (Light Emitting Diode) 11 illuminates at a time of charging and an operation LED 12 illuminating at a time of recording operation and at a time of reproducing operation are disposed directly below the LCD 7 on the front surface 2B of the main body part 2. Thus a user can easily detect whether charging, recording, and the like are surely performed on the basis of an on/off state of the charging LED 11 and the operation LED 12.

Further, a microphone jack 13 and a headphone jack 14 are disposed on a lower side surface 2E of the main body part 2. Thus, by inserting an output plug of an external microphone not shown in the figure into the microphone jack 13, external sound collected by the microphone can be captured and recorded. By inserting an external input plug of headphones not shown in the figure into the headphone jack 14, recorded sound reproduced at a time of reproducing operation can be listened to by the headphones.

The external shape of the LCD cover section 4 is selected so as to cover about ⅔ of the LCD 7 of the main body part 2 in a closed state as shown in FIG. 1 and FIG. 2. Thereby, the IC recorder 1 with the camera when not used can protect the LCD 7 by the LCD cover section 4 by setting the LCD cover section 4 in the closed state, whereas the IC recorder 1 with the camera when used exposes the LCD 7 to allow a user to view a menu screen or the like displayed on the LCD 7 by pulling out the LCD cover section 4 in the upward direction and thereby setting the LCD cover section 4 in the open state as shown in FIG. 3.

A camera cover 8 in a cylindrical shape is rotatably disposed in an upper part of the LCD cover section 4, and the above-described CCD camera 3 is attached to a predetermined position of the camera cover 8 such that an optical axis of the CCD camera 3 is perpendicular to a central axis of the camera cover 8.

In this case, the camera cover 8 can be rotated in a direction of an arrow "a" or in an opposite direction thereto in a range from a rotation position where the CCD camera 3 is hidden within the LCD cover section 4 as shown in FIG. 4A (this rotation position will hereinafter be referred to as an origin position) to a rotation position where the optical axis of the CCD camera 3 substantially coincides with a direction of a normal to the front surface 2B of the main body part 2 as shown in FIG. 4C (this rotation position will hereinafter be referred to as an end point position).

Thereby, the IC recorder 1 with the camera protects the CCD camera 3 when not used by setting the camera cover 8 in a closed state, in which state the camera cover 8 is positioned at the origin position as shown in FIG. 4A. By changing the camera cover 8 from this state to an open state in which the CCD camera 3 is exposed on the back surface 2A side of the main body part 2 as shown in FIG. 4B by rotating the camera cover 8 in the direction of the arrow "a", a desired image can be taken while a moving image displayed on the LCD 7 is viewed. By further changing the camera cover 8 from this state by rotating the camera cover 8 to the end point position in the direction of the arrow "a", the face of a user himself/herself can also be photographed while a moving image displayed on the LCD 7 is viewed, as shown in FIG. 4C.

Incidentally, a macro switch 6I is disposed in the camera cover 8. By setting the macro switch 6I in an on state, a macro mode that can deal with close-up photography in which the CCD camera 3 is close to a subject can be set. In this case, the macro switch 6I is selected to be disposed at a position shifted 180° from that of the CCD camera 3. Thereby, the necessity of the macro mode is determined on the basis of a moving image displayed on the LCD, and when determining that the macro mode is necessary, the user can easily set the macro switch 6I in the on state.

(2) Internal Configuration of IC Recorder 1 with Camera

FIG. 5 shows an internal configuration of the IC recorder 1 with the camera.

When power to the IC recorder 1 with the camera is turned on, the microphones 20A and 20B collect external sound, and send a resulting sound signal S1 to an AD (Analog-Digital)/DA (Digital-Analog) converter 22 via an amplifier 21. The AD/DA converter 22 sequentially subjects the sound signal S1 supplied from the microphones 20A and 20B to a digital conversion process, and sequentially sends resulting sound data D1 to a data processing and controlling unit 23.

The data processing and controlling unit 23 includes: a controlling unit 28 of a microcomputer configuration including a CPU (Central Processing Unit) 24 controlling the IC recorder 1 with the camera as a whole, a ROM (Read Only Memory) 25 storing various programs, a RAM (Random Access Memory) 26 as a work memory for the CPU 24, and a built-in timer 27; and a DSP (Digital Signal Processor) 29 having a function of compressing and decompressing the sound data D1 and image data D3 to be described later.

When one of the recording button 6A, the live view button 6B, the camera shutter button 6C, the menu button 6D, the jog lever 6E, the stop button 6F, the volume button 6G, the voice-up switch 6H, and the macro switch 6I described above that form an operating control section 6 is operated, an operating input signal S2 corresponding to the operation is supplied from the operating control section 6 to the controlling unit 28 of the data processing and controlling unit 23.

The controlling unit 28 is also supplied with an LCD cover state signal S3 indicating the closed state (FIG. 1 and FIG. 2) or the open state (FIG. 3) of the LCD cover section 4 and a camera cover state signal S4 indicating the closed state (FIG. 4A) or the open state (FIGS. 4B and 4C) of the camera cover 8 from a corresponding sensor (not shown) provided within the LCD cover section 4.

Thus, the CPU 24 in the controlling unit 28 recognizes an operation content of a user operation on the basis of the operating input signal S2, and detects present states of the LCD cover section 4 and the camera cover 8 on the basis of the LCD cover state signal S3 and the camera cover state signal S4. The CPU 24 performs corresponding various control processes on the basis of results of the recognition and the detection and various control programs stored in the ROM 25.

In practice, when recognizing that the recording button 6A of the operating control section 6 is pressed on the basis of an operating input signal S2, the CPU 24 determines the states of the LCD cover section 4 and the camera cover 8 on the basis of the LCD cover state signal S3 and the camera cover state signal S4, and when detecting that at least one of the LCD cover section 4 and the camera cover 8 is in a closed state, the CPU 24 correspondingly changes an operation mode to a sound recording mode, and controls the DSP 29. Thus, at this time, the DSP 29 under control of the CPU 24 subjects sound data D1 supplied from the AD/DA converter 22 to an audio compression process in accordance with a predetermined audio compression system such as LPEC (a registered trademark of Sony Corporation) or the like, and sequentially stores resulting compressed sound data D2 in a flash memory 30.

When thereafter recognizing that the stop button 6F is pressed on the basis of an operating input signal S2, the CPU 24 controls the DSP 29 to stop the audio compression process on the sound data D1 supplied from the AD/DA converter 22. Meanwhile, the CPU 24 creates a new message folder ("03072400" to "03072408" in FIG. 7) within a folder selected by the user at that time ("FOLDER1" to "FOLDER3" in FIG. 7). The CPU 24 converts the compressed sound data D2 to a file in the same file format as an audio file format employed in an existing IC recorder. The CPU 24 stores the thus obtained sound file ("03072400.MSV" in FIG. 7) in the message folder. The CPU 24 stores managing information for the message folder in a managing file MSF (FIG. 8) to be described later.

When detecting that both the LCD cover section 4 and the camera cover 8 are in an open state on the basis of the LCD cover state signal S3 and the camera cover state signal S4, the CPU 24 changes the operation mode to a camera mode, and controls the CCD camera 3 to start the CCD camera 3. As a result, an image signal S5 of a scene being photographed by the CCD camera 3 at that time is sequentially output from the CCD camera 3 and supplied to the data processing and controlling unit 23.

Then, when recognizing in this state that the live view button 6B is pressed on the basis of an operating input signal S2, the CPU 24 correspondingly controls the DSP 29. Thus, the DSP 29 at this time sequentially subjects the image signal S5 supplied from the CCD camera 3 to digital conversion, and sends resulting image data D3 to the LCD 7. As a result, a moving image of the scene being photographed by the CCD camera 3 at that time which image is based on the image data D3 is displayed on the LCD 7 in real time.

Further, when thereafter recognizing in this state that the camera shutter button 6C is pressed on the basis of an operating input signal S2, the CPU 24 correspondingly controls the DSP 29. Thus, the DSP 29 at this time captures the image data D3 of a still image for one frame at a moment when the camera shutter button 6C is pressed which image is obtained on the basis of the image data D3, subjects the captured image data D3 to an image compression process in accordance with a predetermined image compression system such for example as JPEG (Joint Photographic Experts Group), and then stores resulting compressed image data D4 in the flash memory 30.

Thereafter the CPU 24 creates a new message folder within a folder selected by the user at that time. The CPU 24 stores an image file of the compressed image data D4 ("P0000000.JPG" to "P0000003.JPG" in FIG. 7) in the message folder. The CPU 24 stores managing information for the message folder in the managing file MSF.

On the other hand, when recognizing that the recording button 6A of the operating control section 6 is pressed on the basis of an operating input signal S2, the CPU 24 determines the states of the LCD cover section 4 and the camera cover 8 on the basis of the LCD cover state signal S3 and the camera cover state signal S4, and when detecting that both the LCD cover section 4 and the camera cover 8 are in an open state, the CPU 24 changes the operation mode to a sound recording and image recording mode, and correspondingly controls the DSP 29.

At this time, as in the above-described sound recording mode, the DSP 29 sequentially subjects sound data D1 supplied from the AD/DA converter 22 to the predetermined audio compression process, and then stores resulting compressed sound data D2 in the flash memory 30. Also, as in the above-described camera mode, the DSP 29 at this time sequentially subjects an image signal S5 supplied from the CCD camera 3 to digital conversion, and sends resulting image data D3 to the LCD 7. As a result, a moving image of a scene being photographed by the CCD camera 3 at that time which image is based on the image data D3 is displayed on the LCD 7 in real time.

Further, when thereafter recognizing in this state that the camera shutter button 6C is pressed on the basis of an operating input signal S2, the CPU 24 correspondingly controls the DSP 29. As in the camera mode, the DSP 29 at this time captures the image data D3 of a still image for one frame at a moment when the camera shutter button 6C is pressed which image is obtained on the basis of the image signal S5 supplied from the CCD camera 3, and subjects the captured image data D3 to an image compression process.

The DSP 29 then stores compressed image data D4 obtained by such an image compression process in the flash memory 30 as compressed image data D4 of an image to serve as a mark for later search for the moment when the camera shutter button 6C is pressed (this image will hereinafter be referred to as a bookmark image) such that the compressed image data D4 is associated with a corresponding position of the compressed sound data D2 being sequentially stored in the flash memory 30 at that time.

When thereafter recognizing that the stop button 6F is pressed on the basis of an operating input signal S2, the CPU 24 creates a new message folder within a folder selected by the user at that time. The CPU 24 stores a sound file of the compressed sound data D2 and image files of compressed image data D4 as described above associated with the sound file in the message folder. The CPU 24 stores managing information for the message folder in the managing file MSF.

Thus, the IC recorder 1 with the camera can not only record sound and still images independently of each other but also record still images as bookmark images in association with sound being recorded.

The IC recorder 1 with the camera enables a search for a desired message folder or a desired sound position within a message folder on the basis of a bookmark image thus recorded in association with sound.

In practice, when the jog lever 6E is pressed and the. CPU 24 recognizes on the basis of an operating input signal S2 that a command to display a selecting screen for selecting a desired message folder within a desired folder (this screen will hereinafter be referred to as a message folder selecting screen) or a selecting screen for selecting a desired bookmark image within that message folder (this screen will hereinafter be referred to as a bookmark image selecting screen), the CPU 24 reads corresponding image data D3 from the ROM 25, and then sends the image data D3 to the LCD 7 to thereby display a message folder selecting screen 33 as shown in FIG. 6 or a bookmark image selecting screen 34 (FIG. 6) having a similar composition to that of the message folder selecting screen 33 on the LCD 7.

In this case, to display the message folder selecting screen 33 on the LCD 7, the CPU 24 reads, from the flash memory 30, an image file (compressed image data D4) of a representative bookmark image (hereinafter referred to as a representative image) set in advance for each message folder within the folder, makes the DSP 29 decode the compressed image data D4, and creates thumbnail images $P_1$ to $P_6$ of a predetermined size on the basis of resulting image data D3.

Figure 6:
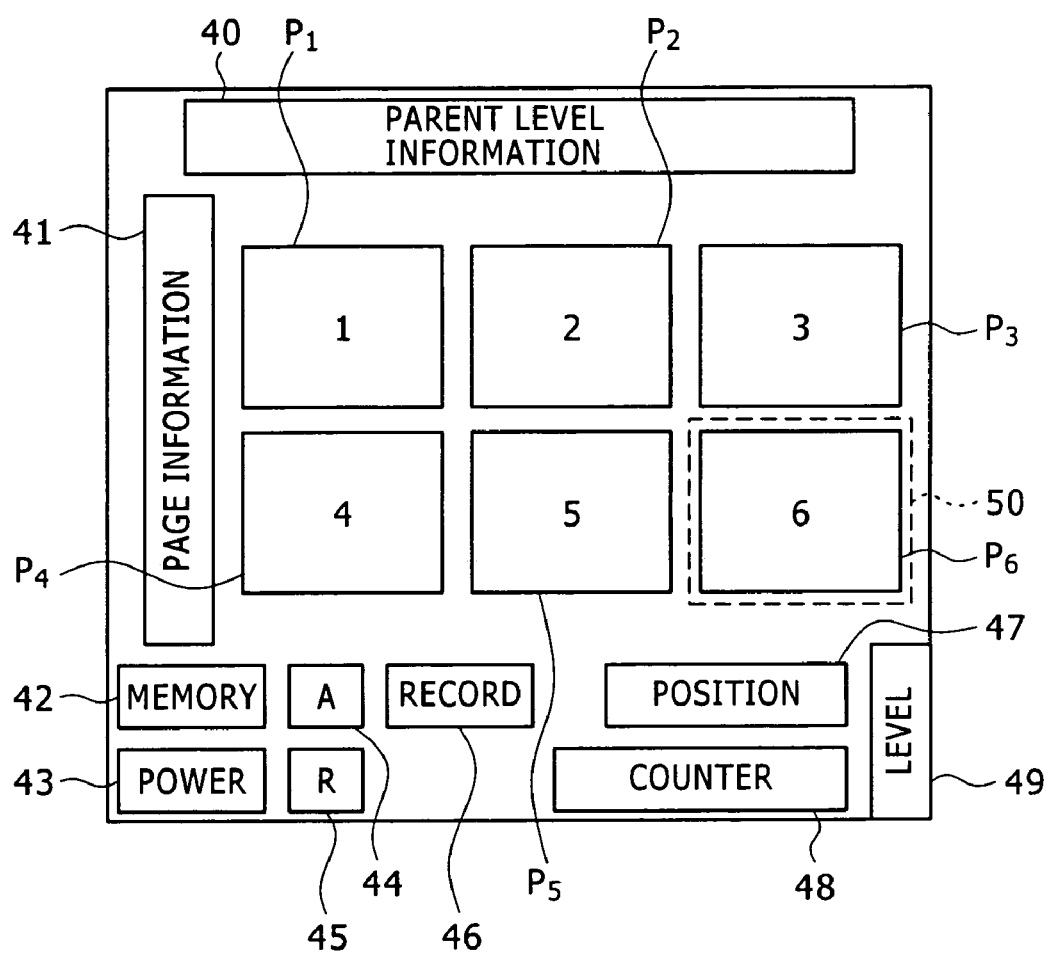
FIG. 6 is a plan view of an outline of composition of a message folder selecting screen.

Then, as shown in FIG. 6, the CPU 24 displays a list of the thus obtained thumbnail images $P_1$ to $P_6$ for the respective message folders within the message folder selecting screen 33. Incidentally, for a message folder including only sound and including no still image, a predetermined icon is displayed instead of a thumbnail image.

When the jog lever 6E is thereafter operated to select one of the thumbnail images $P_1$ to $P_6$ within the message folder selecting screen 33, the CPU 24 reads a sound file (compressed sound data D2) within a corresponding message folder from the flash memory 30 on the basis of the above-mentioned managing file MSF (FIG. 8), and then makes the DSP 29 decode the compressed sound data D2.

As a result, sound data D1 obtained by such a decoding process is output from the DSP 29 to be subjected to analog conversion in the AD/DA converter 22. A resulting sound signal S6 is supplied to the speaker 32 via an amplifier 31. Thereby, at this time, sound based on the sound signal S6 is output from the speaker 32.

Similarly, to display the bookmark image selecting screen 34 (FIG. 6) on the LCD 7, the CPU 24 reads, from the flash memory 30, image files (pieces of compressed image data D4) of respective bookmark images within a corresponding message folder on the basis of the managing file MSF, makes the DSP 29 decode the pieces of compressed image data D4, and creates thumbnail images $P_1$ to $P_6$ of a predetermined size on the basis of pieces of resulting image data D3. Then, the CPU 24 displays a list of the thus obtained thumbnail images $P_1$ to $P_6$ for the respective bookmark images within the bookmark image selecting screen 34.

When the jog lever 6E is thereafter operated to select one of the thumbnail images $P_1$ to $P_6$ within the bookmark image selecting screen 34, the CPU 24 reads, from the flash memory 30, compressed sound data D2 after a sound part associated with the original bookmark image of the thumbnail image $P_1$ to $P_6$ in a corresponding sound file, and then makes the DSP 29 decode the compressed sound data D2.

As a result, sound data D1 obtained by such a decoding process is output from the DSP 29 to be subjected to analog conversion in the AD/DA converter 22. A resulting sound signal S6 is supplied to the speaker 32 via the amplifier 31. Thereby, based on the sound signal S6, sound after the sound position corresponding to the bookmark image selected by the user in the selected message folder is output from the speaker 32.

Thus, the IC recorder 1 with the camera makes it possible to quickly and easily access a desired message folder or a desired sound position in the message folder on the basis of the representative image of the message folder or each bookmark image within the message folder.

In addition to such a configuration, the IC recorder 1 with the camera allows a new bookmark image to be recorded in a message folder including a sound file at a time of reproducing the sound file, and allows sound to be recorded later in a message folder including only an image file in association with the image file.

In practice, when recognizing that the camera shutter button 6C is pressed on the basis of an operating input signal S2 in a state in which the CPU 24 detects that both the LCD cover section 4 and the camera cover 8 are open on the basis of the LCD cover state signal S3 and the camera cover state signal S4 and a sound file of a message folder selected by the user is reproduced as described above, the CPU 24 correspondingly controls the DSP 29.

Under control of the CPU 24, the DSP 29 at this time captures image data D3 of a still image for one frame at a moment when the camera shutter button 6C is pressed which image is obtained on the basis of an image signal S5 supplied from the CCD camera 3, and subjects the captured image data D3 to an image compression process. The DSP 29 then stores compressed image data D4 obtained by such an image compression process in the flash memory 30 as an image file of a bookmark image at the moment when the camera shutter button 6C is pressed such that the compressed image data D4 is associated with the sound file being reproduced at that time.

On the other hand, when recognizing that the recording button 6A is pressed on the basis of an operating input signal S2 after a message folder including only an image file is selected on the message folder selecting screen 33 (FIG. 6) displayed on the LCD 7 and a command for additional recording in the message folder is input by a predetermined operation using the jog lever 6E, the CPU 24 correspondingly controls the DSP 29.

Thus, under control of the CPU 24, the DSP 29 at this time subjects sound data D1 supplied from the AD/DA converter 22 to an audio compression process, and then stores resulting compressed sound data D2 as a sound file in association with the image file in the flash memory 30. Incidentally, in this case, a still image based on the original image file is automatically set as a bookmark image at a start position of the additionally recorded sound.

Thus the IC recorder 1 with the camera allows a bookmark image to be additionally recorded later freely at a desired position of recorded sound, and allows sound to be additionally recorded later in association with a recorded still image. It is thereby possible to improve ease of search for a desired position of recorded sound and improve functionality of the IC recorder.

(3) Directory Structure of Data Managing Format in IC Recorder with Camera

Description will next be made of a directory structure of a Voiscape Format as a data managing format for compressed sound data D2 and compressed image data D4, which format is employed in the IC recorder 1 with the camera.

Figure 7:
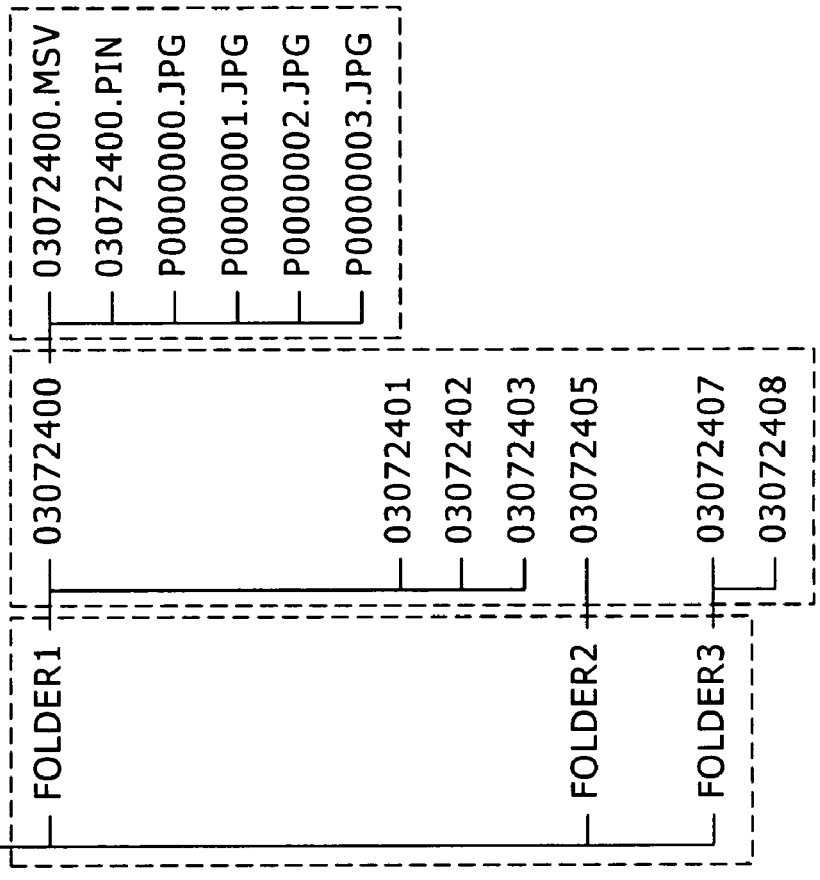
FIG. 7 is a conceptual diagram showing a directory structure of a Voiscape Format.

FIG. 7 shows the directory structure of the Voiscape Format. As shown in FIG. 7, a sound file ("03072400.MSV") of recorded sound and image files ("P0000000.JPG" to "P0000003.JPG") of bookmark images recorded in association with the sound file are stored in a folder referred to as "VOISCAPE" created within a folder referred to as "MSSONY."

Folders ("FOLDER1" to "FOLDER3") including message folders are present within this "VOISCAPE." The user can select a desired folder as a position where a sound file of recorded sound and the like are stored from among these folders, and create a new folder.

Figure 8:
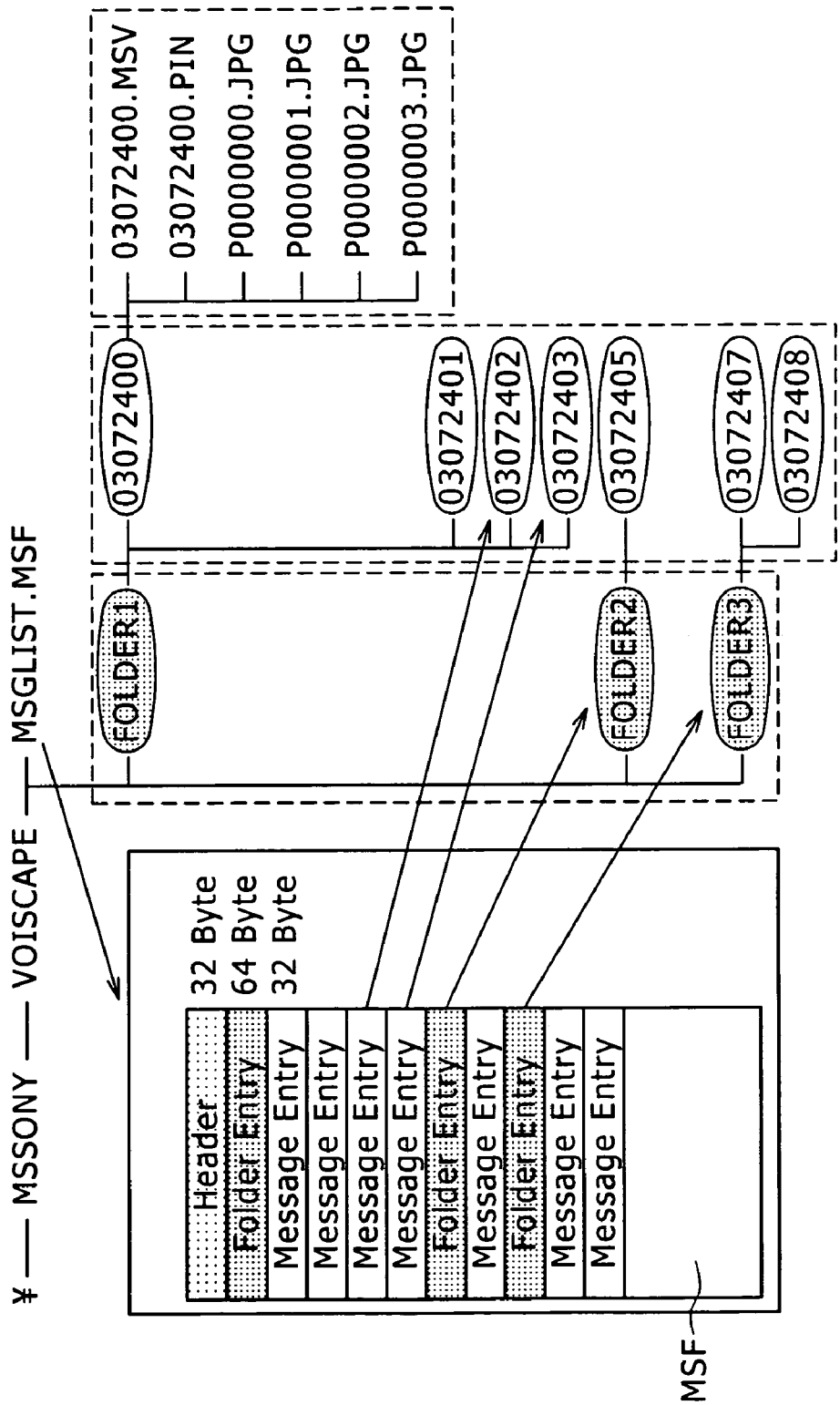
FIG. 8 is a conceptual diagram of assistance in explaining a data structure of a message folder managing file.

"VOISCAPE" also includes the above-described managing file MSF ("MSGLIST.MSF") for managing the created message folders. As shown in FIG. 8, the managing file MSF has a data structure in which a header ("Header") of 32 [Bytes] in which a year, a month, and a day, hours, minutes, and seconds, and a day of the week when the managing file MSF was last edited, and the like are described is followed by folder entries ("Folder Entry") in which folder names and the like of the respective folders ("FOLDER1" to "FOLDER3") are described, and message entries ("Message Entry") in which folder names of the respective message folders created within the folders ("FOLDER1" to "FOLDER3"), a data and time of creation of the message folders, and the like are described, the folder entries and the message entries being sequentially described for each folder.

In this Voiscape Format, when a new folder or a new message folder is created, a folder entry or a message entry in which various managing information as described above is described is always registered in the managing file MSF. Thereby the Voiscape Format makes it possible to search surely and quickly for a desired message file within a folder on the basis of the managing file MSF.

Further, each folder ("FOLDER1" to "FOLDER3") includes one or a plurality of message folders ("03072400" to "03072408") created according to conditions of use by the user. Each of the message folders includes a sound file ("03072400.MSV") of compressed sound data D2 obtained by recording, an image file ("P0000000.JPG" to "P0000003.JPG") of compressed image data D4 of each bookmark image taken during the recording, and an image managing file PIN ("03072400.PIN") for managing each image file. Incidentally, as described above, the sound file has the same file format as a sound file format employed in an existing IC recorder.

Figure 9:
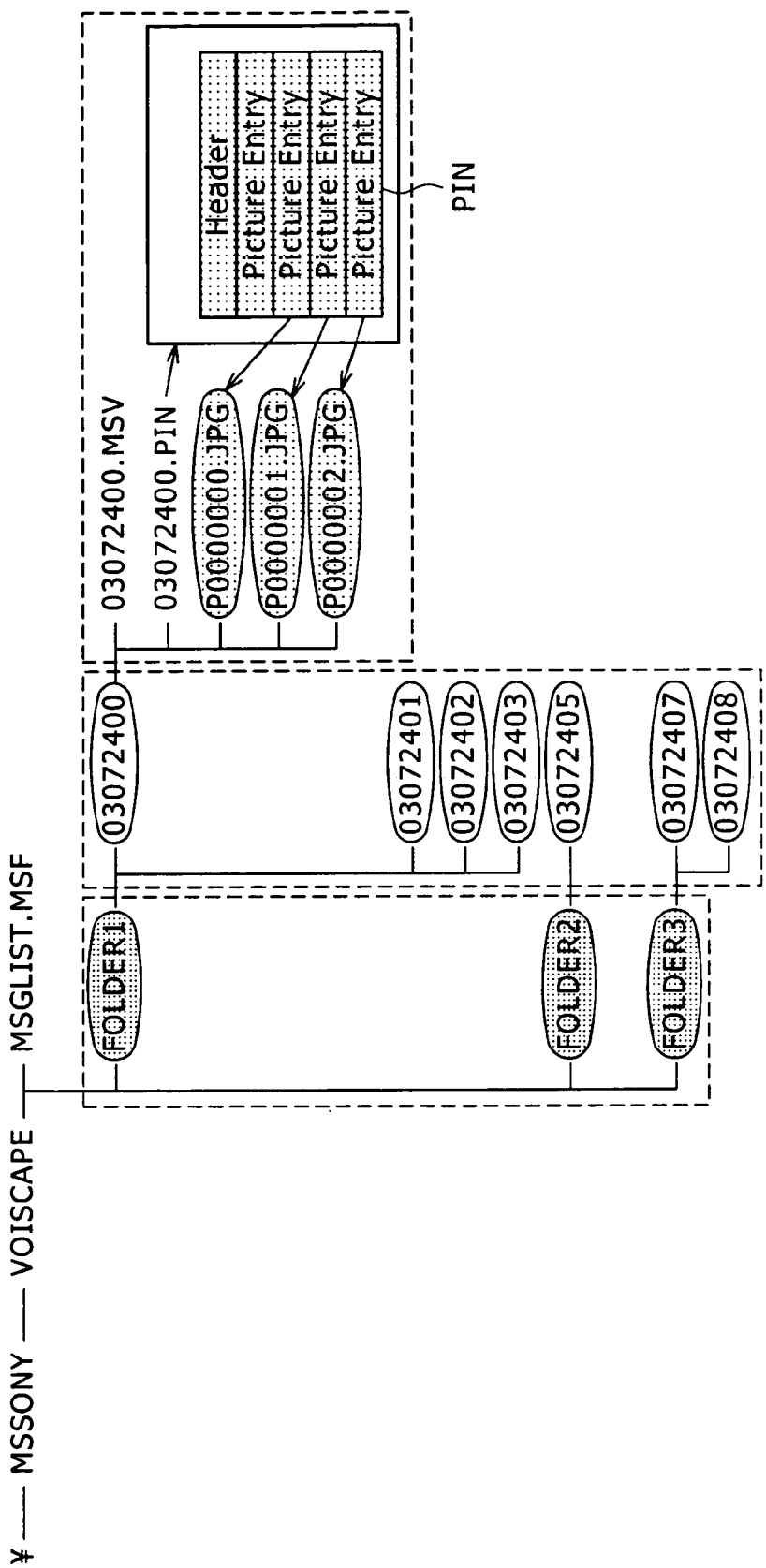
FIG. 9 is a conceptual diagram of assistance in explaining a data structure of an image managing file.

As shown in FIG. 9, the image managing file PIN has a data structure in which a plurality of picture entries ("Picture Entry") are arranged subsequently to a header ("Header") in which a year, a month, and a day, hours, minutes, and seconds, and a day of the week when the image managing file PIN was last edited, and the like are described.

In this case, described in a first picture entry are a file name of an image file of a bookmark image when the bookmark image is set as a representative image, a corresponding position (hours, minutes, and seconds) in the sound file (sound data D1) of the bookmark image, and the like. Incidentally, when no representative image is set, zero data is stored in all parts of the first picture entry other than a picture ID, which is described at a start of each picture entry and indicates that a pertinent area is a picture entry.

Described in a second picture entry and subsequent picture entries are file names of image files of respective bookmark images taken during recording of a corresponding sound, corresponding positions (hours, minutes, and seconds) in the sound of the bookmark images, and the like. In this case, the second picture entry or a subsequent picture entry is sequentially added in the rear each time the image file of a new bookmark image is recorded. Hence, an order in which the second picture entry and the subsequent picture entries are arranged in the image managing file PIN represents, as it is, an order of positions with which the image files are associated from a start of the corresponding sound.

Thus, the Voiscape Format makes it possible to search for the representative image of the message folder or a corresponding position in the sound of each bookmark image on the basis of the image managing file PIN. In addition, by thus storing a sound file and an image file of each bookmark image associated with the sound file within a same folder (message folder), relation between the sound file and the image file is easily recognized when these pieces of data are captured into an external personal computer and viewed by Explorer. It is consequently possible to prevent the user from accidentally deleting the sound file or the image file.

(4) Method of Operation on Message Folder Selecting Screen 33 or Like

Description will next be made of a method of operation on the message folder selecting screen 33 and the bookmark image selecting screen 34 described with reference to FIG. 6. However, since the methods of operation on the message folder selecting screen 33 and the bookmark image selecting screen 34 are identical, description in the following will be made by taking the message folder selecting screen 33 as an example.

The IC recorder 1 with the camera can be made to display the message folder selecting screen 33 shown in FIG. 6 on the LCD 7 by a predetermined operation as described above.

In this case, the message folder selecting screen 33 includes: a parent level information displaying part 40 for displaying a folder name of a folder in a parent level; a page information displaying part 41 formed by a scroll bar, for example; a memory remaining amount displaying part 42 and a power remaining amount displaying part 43 for displaying a remaining amount of memory of the flash memory 30 and a remaining amount of power supply energy, respectively; an alarm mark displaying part 44 and a repeat mark displaying part 45 for respectively displaying an alarm mark and a repeat mark when a repeat mode is set; a position displaying part 47 for displaying the ordinal position of a message folder that a cursor 50 to be described later indicates among a total number of message folders included in the folder; a counter displaying part 48 for displaying a time that has elapsed from a start of reproduction to a present time while a sound file is reproduced; and a level displaying part 49 for displaying a present level position (a folder level, a message level, or a bookmark level).

Incidentally, the IC recorder 1 with the camera has three kinds of levels, that is, a "folder level," a "message level," and a "bookmark level" in descending order of level. Thus, in the case of the message folder selecting screen 33, a folder name of a folder selected at a time in question is displayed in the parent level information displaying part 40. When a level change is made by operating the jog lever 6E, the display screen is changed to a bookmark image selecting screen 34 for a message folder indicated by the cursor 50 at that time. Incidentally, in the case of the bookmark image selecting screen 34, a folder name of the message folder selected at that time is displayed in the parent level information displaying part 40. When a level change is made by operating the jog lever 6E, the display screen is changed to a predetermined folder selecting screen not shown in the figures for selecting a desired folder.

The message folder selecting screen 33 initially displays a list of thumbnail images $P_1$ to $P_6$ of bookmark images set in advance as representative images of six message folders having earliest creation dates and times among message folders included in a selected folder, on the basis of the image managing files ("Picture Entry" in FIG. 9) within the message folders in question. At this time, when the message folder does not include image files and includes only a sound file, or the message folder does not have a representative image set therein, for example, a predetermined icon is displayed, as described above.

The cursor 50 is displayed on the message folder selecting screen 33 so as to surround one thumbnail image $P_1$ to $P_6$ (this state will hereinafter be referred to as "indicate the thumbnail image $P_1$ to $P_6$"). The user can sequentially move the cursor 50 so as to indicate the thumbnail image $P_1$ to $P_6$ of a next message folder by pressing the jog lever 6E (FIGS. 1 to 3) to a forward ("FF") side for a while during reproduction of a sound file or during a reproduction stop. On the other hand, the user can sequentially move the cursor 50 so as to indicate the thumbnail image $P_1$ to $P_6$ of a previous message folder by pressing the jog lever 6E to a reverse ("FR") side for a while during reproduction of a sound file or during a reproduction stop.

Figure 10:
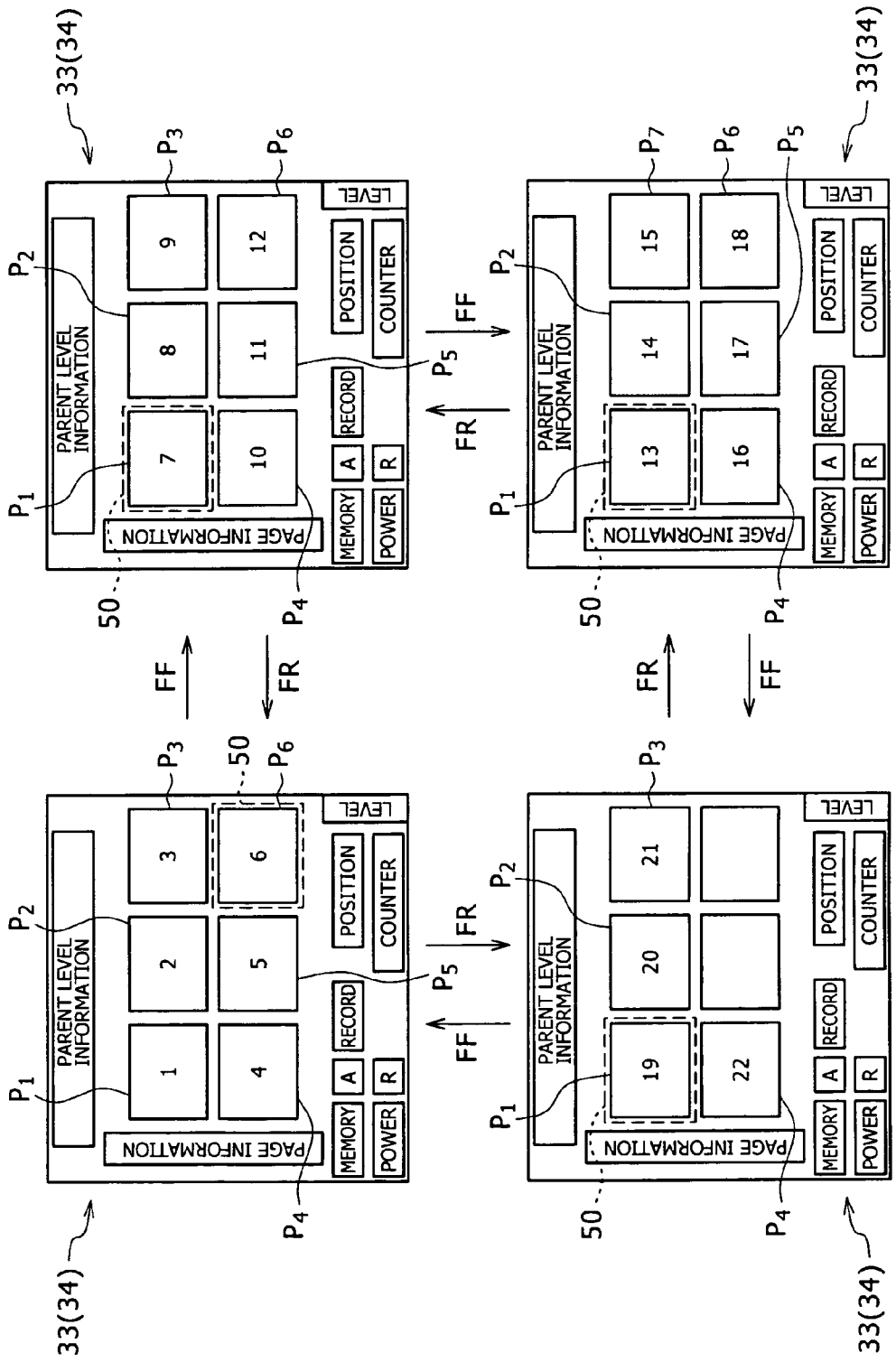
FIG. 10 is a plan view of assistance in explaining a method of operation on the message folder selecting screen.

Further, by pressing the jog lever 6E to the forward ("FF") side for a while in a state in which the cursor 50 indicates the thumbnail image $P_6$ of a last message folder among the six thumbnail images $P_1$ to $P_6$ displayed at that time on the message folder selecting screen 33, a list of the thumbnail images $P_1$ to $P_6$ of bookmark images set in advance as representative images of next six message folders included in the folder can be displayed, as shown in FIG. 10.

Similarly, by pressing the jog lever to the reverse ("FR") side for a while in a state in which the cursor 50 indicates the thumbnail image $P_1$ of a first message folder among the six thumbnail images $P_1$ to $P_6$ displayed at that time on the message folder selecting screen 33, a list of the thumbnail images $P_1$ to $P_6$ of bookmark images set in advance as representative images of previous six message folders included in the folder can be displayed, as shown in FIG. 10.

Thus, the user can search for a desired message folder by such an operation of the jog lever 6E on the basis of the thumbnail images $P_1$ to $P_6$ displayed on the message folder selecting screen 33. When detecting the message folder, the user moves the cursor 50 so as to indicate the thumbnail image $P_1$ to $P_6$ of a representative image of the message folder, and then presses the jog lever 6E to thereby set the message folder as a selected object. As a result, a sound file within the thus set message folder is reproduced, and the reproduced sound is output from the speaker 32 (FIG. 5).

Thus, the IC recorder 1 with the camera makes it possible to search for a desired message folder on the basis of representative images set for respective message folders.

Figure 11:
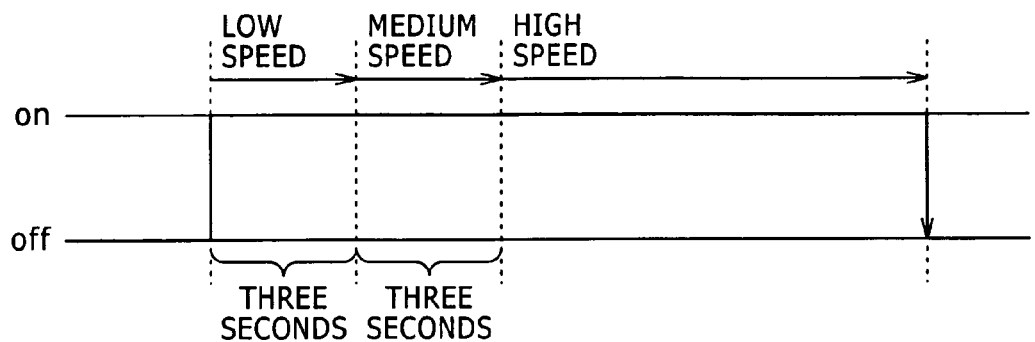
FIG. 11 is a conceptual diagram of assistance in explaining a method of operation on the message folder selecting screen.

Incidentally, on the message folder selecting screen 33, when the jog lever 6E continues to be pressed to the forward ("FF") side or the reverse ("FR") side for a while when reproduction of a sound file is stopped, the cursor 50 is moved at a low speed (for example 0.4 [seconds/message]) for an initial three seconds, at a medium speed (for example 0.2 [seconds/message]) for a next three seconds, and thereafter at a high speed (for example 0.2 [seconds/page (six messages)]), as shown in FIG. 11. However, in switching from a last message folder (a message folder created last) within the folder to a first message folder (a message folder created first) within the folder or in the reverse of the switching, the continuous forward or reverse as described above is stopped, and then the continuous forward or reverse is started all over again (the movement of the cursor is started from the low speed).

Thus, the IC recorder 1 with the camera changes the speed of movement of the cursor 50 according to a state of operation of the jog lever 6E so that the user can access a desired message folder more quickly.

(5) Concrete Process of CPU 24

Figure 12:
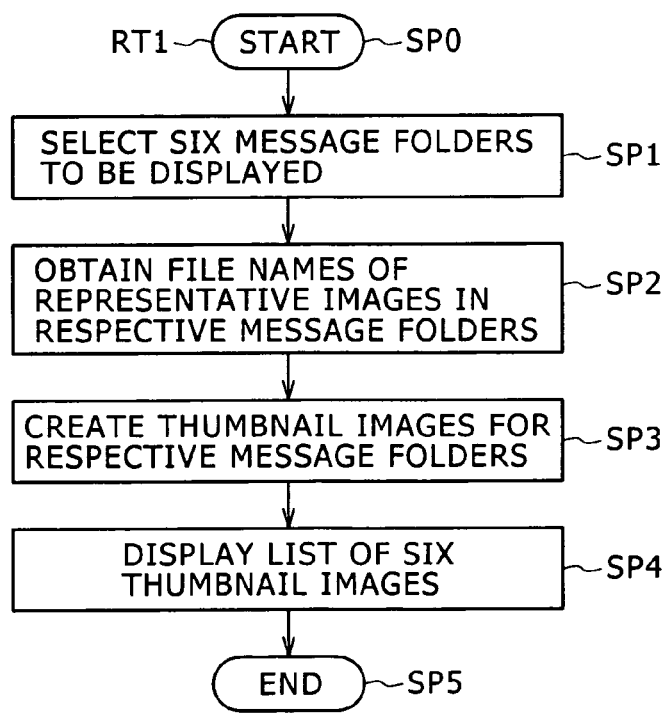
FIG. 12 is a flowchart of a selecting screen display process procedure.

When the jog lever 6E (FIG. 1) is operated to give the CPU 24 (FIG. 5) of the controlling unit 23 (FIG. 5) a command to display the message folder selecting screen 33, the message folder selecting screen 33 is displayed on the LCD 7 (FIG. 1) according to a selecting screen display process procedure RT1 represented in FIG. 12 on the basis of a control program stored in the ROM 25 (FIG. 5).

Specifically, when supplied with the command to display the message folder selecting screen 33, the CPU 24 starts the selecting screen display process procedure RT1 in step SP0. In next step SP1, the CPU 24 selects six message folders having earliest creation dates and times at that time on the basis of the message managing file MSF ("MSGLIST.MSF") described above with reference to FIG. 8 stored in the flash memory 30 (FIG. 5).

Next, proceeding to step SP2, the CPU 24 obtains file names of image files of representative images set in the six message folders selected in step SP1 on the basis of image managing files PIN ("03072400.PIN") as described above with reference to FIG. 9 within these message folders stored in the flash memory 30.

Thereafter proceeding to step SP3, the CPU 24 reads, from the flash memory 30, data (compressed image data D4) of the image files of the file names obtained in step SP2 for the six message folders selected in step SP1, makes the DSP 29 decode the data, and creates thumbnail images $P_1$ to $P_6$ of a predetermined size on the basis of resulting image data D3.

Then proceeding to step SP4, the CPU 24 reads screen data of the message folder selecting screen 33 from the ROM 25 (FIG. 5), generates image data for the message folder selecting screen 33 on which the six thumbnail images $P_1$ to $P_6$ are displayed, on the basis of the read screen data and the image data of the thumbnail images $P_1$ to $P_6$ for the six message folders which images are created in step SP3, and then sends the image data for the message folder selecting screen 33 to the LCD 7. The message folder selecting screen 33 on which the six thumbnail images $P_1$ to $P_6$ are displayed is thereby displayed on the LCD 7.

Thereafter proceeding to step SP5, the CPU 24 ends the selecting screen display process procedure RT1.

Figure 13:
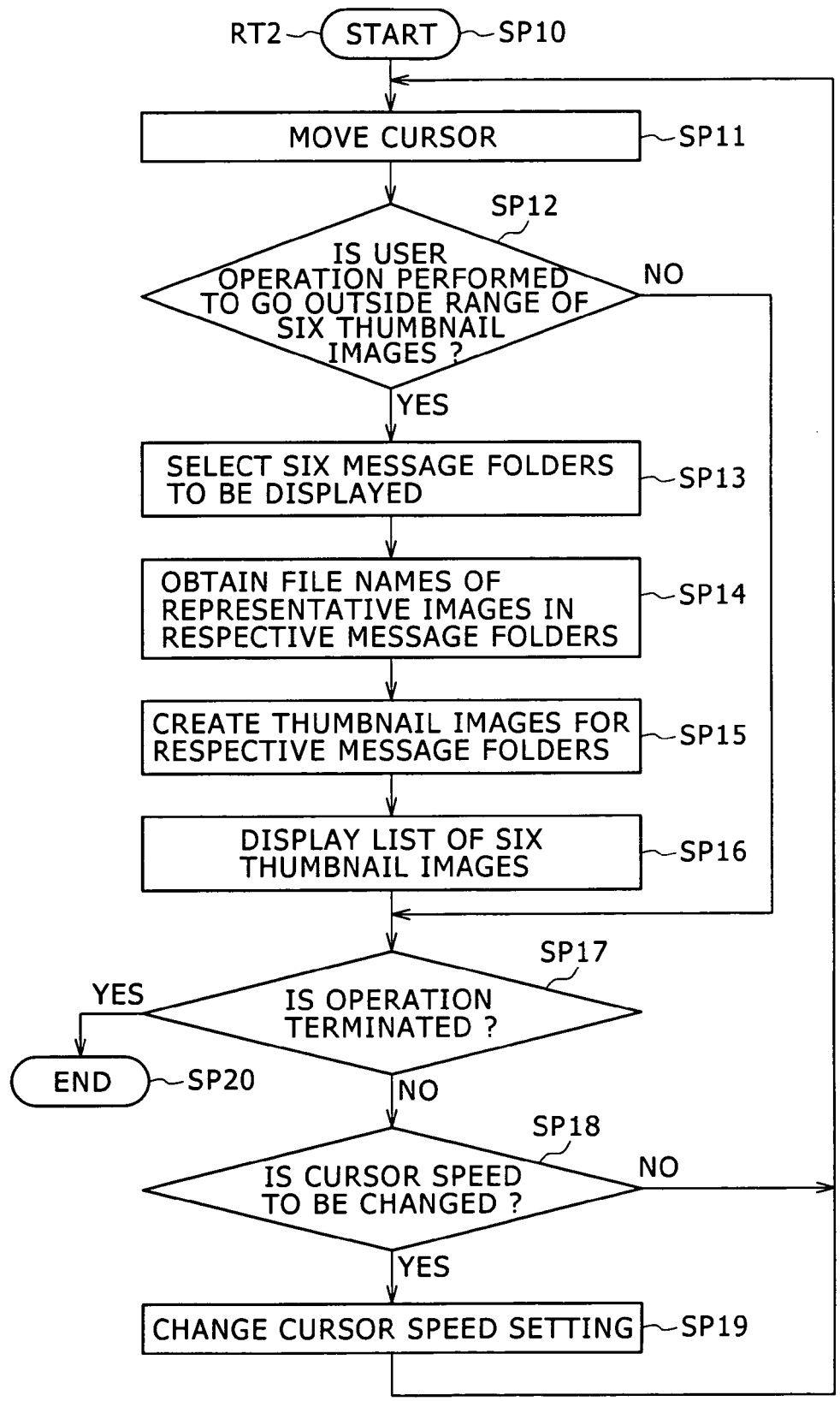
FIG. 13 is a flowchart of a selecting screen display updating process procedure.

When the jog lever 6E (FIG. 1) is thereafter pressed to the forward ("FF") side or the reverse ("FR") side, the CPU 24 sequentially updates contents displayed on the message folder selecting screen 33 according to a selecting screen display updating process procedure RT2 represented in FIG. 13 on the basis of a control program stored in the ROM 25.

Specifically, when the jog lever 6E is operated after the selecting screen display process procedure RT1 (FIG. 12) is ended, the CPU 24 starts the selecting screen display updating process procedure RT2 in step SP10. In next step SP11, according to the operation of the jog lever 6E at that time, the CPU 24 sequentially moves the display position of the cursor 50 (FIG. 6) to a corresponding position.

In next step SP12, the CPU 24 determines whether a user operation is performed to go outside the range of the thumbnail images $P_1$ to $P_6$ displayed on the message folder selecting screen 33 at that time, that is, determines whether to display the thumbnail images $P_1$ to $P_6$ for the next or previous six message folders on the basis of further pressing of the jog lever 6E to the forward ("FF") side in a state of the cursor 50 indicating the thumbnail image $P_6$ of a last message folder displayed on the message folder selecting screen 33 at that time or further pressing of the jog lever 6E to the reverse ("FR") side in a state of the cursor 50 indicating the thumbnail image $P_1$ of a first message folder displayed on the message folder selecting screen 33 at that time.

Then, when the CPU 24 obtains a negative result in step SP12, the CPU 24 proceeds to step SP17. When the CPU 24 obtains a positive result, on the other hand, the CPU 24 proceeds to step SP13, and then carries out steps SP13 to SP16 in the same manner as steps SP1 to SP4 described above with reference to FIG. 12.

Then, proceeding to step SP17, the CPU 24 determines whether the operation of pressing the jog lever 6E at that time is terminated. When obtaining a negative result, the CPU 24 proceeds to step SP18 to determine whether to change the speed of movement of the cursor 50 from a low speed to a medium speed, from the medium speed to a high speed, or from the high speed to the low speed, as described above with reference to FIG. 11.

When obtaining a negative result in step SP18, the CPU 24 returns to step SP11. When obtaining a positive result in step SP18, the CPU 24 proceeds to step SP19 to change the speed of movement of the cursor 50 at that time to a corresponding moving speed. Then, the CPU 24 returns to step SP11, and thereafter repeats steps SP11 to SP19 until a positive result is obtained in step SP17.

When the operation of pressing the jog lever 6E to the forward ("FF") side or the reverse ("FR") side is eventually terminated, and thus the CPU 24 obtains a positive result in step SP17, the CPU 24 proceeds to step SP20 to end the selecting screen display updating process procedure RT2.

Figure 14:
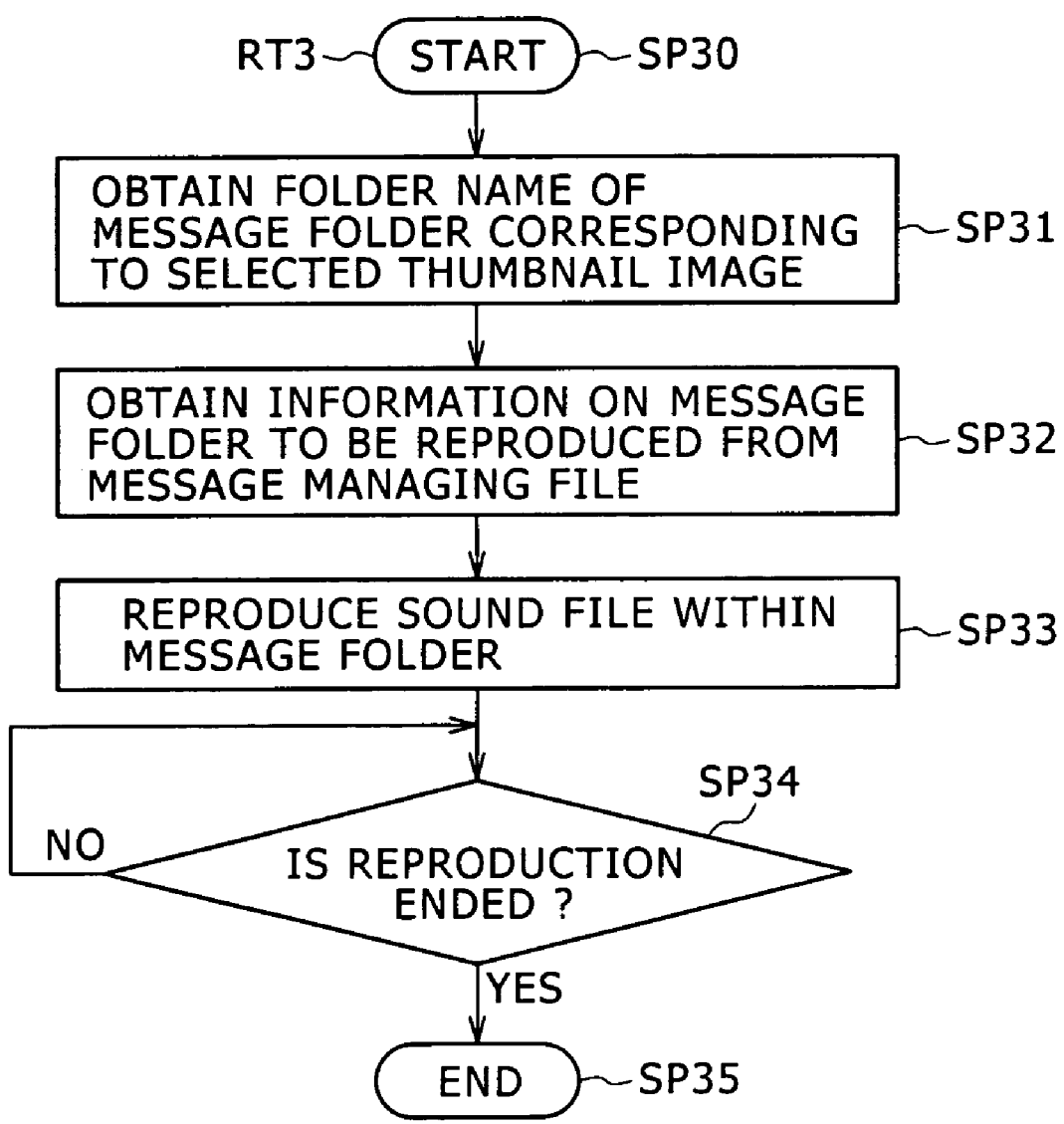
FIG. 14 is a flowchart of a sound reproduction process procedure.

When one message folder is thereafter selected and determined on the message folder selecting screen 33, the CPU 24 reproduces a sound file within the selected and determined message folder according to a sound reproduction process procedure RT3 represented in FIG. 14 on the basis of a control program stored in the ROM 25 (FIG. 5).

Specifically, when one message folder is thereafter selected and determined on the message folder selecting screen 33, the CPU 24 starts the sound reproduction process procedure RT3 in step SP30. In next step SP31, the CPU 24 obtains a folder name of the message folder corresponding to a thumbnail image $P_1$ to $P_6$ selected at that time.

Then proceeding to step SP32, the CPU 24 obtains information on the message folder from the message managing file MSF ("MSGLIST.MSF") described above with reference to FIG. 8 stored in the flash memory 30 (FIG. 5).

Next, proceeding to step SP33, the CPU 24 reads compressed sound data D2 of a sound file included in the message folder from the flash memory 30 on the basis of the information obtained in step SP32, and makes the DSP 29 decode the compressed sound data D2. As a result, sound data D1 obtained by such a decoding process is output from the DSP 29 to be subjected to analog conversion in the AD/DA converter 22 (FIG. 5). The result is supplied as a sound signal S6 to the speaker 32 (FIG. 5). Thereby, sound based on the sound signal S6 is output from the speaker 32.

Thereafter proceeding to step SP34, the CPU 24 waits for the reproduction of the sound file to end. When the reproduction of the sound file eventually ends and thus the CPU 24 obtains a positive result in step SP34, the CPU 24 proceeds to step SP35 to end the sound reproduction process procedure RT3.

(6) Operations and Effects of Present Embodiment

In the above-described constitution, the IC recorder 1 with the camera stores compressed image data D4 of each still image taken during sound recording in association with a sound file of the recorded sound in the flash memory 30. On the other hand, when one folder ("FOLDER1" to "FOLDER3"in FIG. 7) is selected and a command to display the message folder selecting screen 33 is given, the IC recorder 1 with the camera creates thumbnail images $P_1$ to $P_6$ of images set as representative images among still images based on compressed image data D4 recorded and stored in association with sound files (message folders) within the folder, and displays a list of the thumbnail images $P_1$ to $P_6$ on the message folder selecting screen 33.

When one thumbnail image $P_1$ to $P_6$ is thereafter selected from among the thumbnail images $P_1$ to $P_6$ displayed in the form of the list on the message folder selecting screen 33, the IC recorder 1 with the camera reproduces a sound file within the corresponding message folder.

Thus, the IC recorder 1 with the camera makes it possible to intuitively find a desired sound file among sound files recorded and stored within the IC recorder 1 with the camera on the basis of thumbnail images $P_1$ to $P_6$ displayed in the form of a list on the message folder selecting screen 33. It is therefore possible to search for a desired sound file far more quickly and easily than when a search for a sound file is made on the basis of only reproduced sound, and thus greatly improve ease of search.

According to the above-described constitution, compressed image data D4 of each still image taken during sound recording is stored in association with a sound file of the recorded sound in the flash memory 30. On the other hand, when one folder ("FOLDER1" to "FOLDER3" in FIG. 7) is selected and a command to display the message folder selecting screen 33 is given, thumbnail images $P_1$ to $P_6$ of images set as representative images among still images based on compressed image data D4 recorded and stored in association with sound files (message folders) within the folder are created, and a list of the thumbnail images $P_1$ to $P_6$ is displayed on the message folder selecting screen 33. It is thereby possible to intuitively find a desired sound file (each message folder) on the basis of thumbnail images $P_1$ to $P_6$. Thus, an IC recorder can be realized which makes it possible to improve ease of search for a desired sound information file and thus greatly improve ease of use.

(7) Other Embodiments

It is to be noted that while in the foregoing embodiment, description has been made of a case where the present invention is applied to an IC recorder (the IC recorder 1 with the camera), the present invention is not limited to this, and is widely applicable to various other recording and reproducing devices. In this case, the present invention is applicable even when such recording and reproducing devices use recording media other than the flash memory 30 as a recording medium for recording and storing sound files and image files obtained by sound recording and photographing.

In addition, while in the foregoing embodiment, description has been made of a case where six thumbnail images $P_1$ to $P_6$ of images set as representative images of message folders or images included within a message folder are displayed on the message folder selecting screen 33 or the bookmark image selecting screen 34, the present invention is not limited to this, and the number of thumbnail images displayed on the message folder selecting screen 33 or the like may be other than six.

The present invention is widely applicable to not only an IC recorder 1 with a camera but also various other recording and reproducing devices.

It should be understood by those skilled in the art that various modifications, combinations, sub-combinations and alterations may occur depending on design requirements and other factors insofar as they are within the scope of the appended claims or the equivalents thereof.

What is claimed is:

1. A portable type recording and reproducing device comprising:
   sound collecting means for collecting external sound, and outputting sound information corresponding to a result of sound collection;
   photographing means for photographing an outside of the device, and outputting image information corresponding to a result of photographing;
   recording means for converting said sound information output from said sound collecting means to files in message units and recording said files on a predetermined recording medium, and recording said image information output from said photographing means on the recording medium in association with a corresponding file of said sound information as said sound information and image information is recorded in response to a user actuating a shutter button to record said image information, said recording means associating a first image information with a first position in a sound information file and associating a second image information with a second position in said sound information file, said recording means recording third image information after said sound information file is recorded, said recording means associating the third image information with a third position in the sound information file based on user input;
   display means for displaying images based on said image information associated with said sound information file, said display means displaying information on at least three different levels, and said display means simultaneously displaying a name of a level currently being displayed and level content, the names of types of levels including a folder level, a message level, and a bookmark level, folder level content including a plurality of message folders, and message level content including a plurality of bookmarks stored in the message folder; and
   reproducing means for reproducing said sound information file associated with said image selected by a predetermined external operation among said images displayed by said display means, said reproducing means reproducing said sound information file from the first position when the first image information is selected, reproducing said sound information file from the second position when the second image information is selected, and reproducing said sound information file from the third position when the third image information is selected.

2. The recording and reproducing device as claimed in claim 1, wherein said display means displays a list of the images based on said image information associated with the respective said files of said sound information.

3. The recording and reproducing device as claimed in claim 1, wherein said display means displays thumbnail images based on said image information associated with the respective said files of said sound information.

4. The recording and reproducing device as claimed in claim 1, wherein said display means displays an image set as a representative image among said images based on one or a plurality of pieces of said image information associated with each of said files of said sound information.

5. The recording and reproducing device as claimed in claim 1, wherein said external operation is an operation of moving a cursor displayed together with said images by said display means so that the cursor indicates a desired said image by operating a predetermined operating element, and then setting said image as a selected object by operating said operating element.

6. The recording and reproducing device as claimed in claim 1, wherein said recording means creates an image managing file including a filename of each of the first image information and a second image information, and the first position and the second position.

7. The recording and reproducing device as claimed in claim 1, wherein said recording means stores sound information and associated image information in a same folder, the recording means generating a new folder for each new sound information.

8. The recording and reproducing device as claimed in claim 1, wherein said display is configured to display a remaining amount of memory of the device simultaneously with said images.

9. A recording and reproducing method comprising:
converting sound information obtained by collecting external sound to files in message units and recording the files on a predetermined recording medium, and recording image information obtained by photographing an image on the recording medium in association with a corresponding file of said sound information as said sound information and image information is recorded in response to a user actuating a shutter button to record said image information, said recording including associating a first image information with a first position in a sound information file and associating a second image information with a second position in said sound information file;
recording third image information after said sound information file is recorded;
associating the third image information with a third position in the sound information file based on user input;
displaying images based on said image information associated with said sound information file, said displaying including displaying information on at least three different levels, and said displaying including simultaneously displaying a name of a level currently being displayed and level content, the names of types of levels including a folder level, a message level, and a bookmark level, folder level content including a plurality of message folders, and message level content including a plurality of bookmarks stored in the message folder; and
reproducing said sound information file associated with said image selected by a predetermined external operation among the displayed said images, said reproducing including reproducing said sound information file from the first position when the first image information is selected, reproducing said sound information file from the second position when the second image information is selected, and reproducing said sound information file from the third position when the third image information is selected.

10. The recording and reproducing method as claimed in claim 9, wherein in said displaying, a list of the images based on said image information associated with the respective said files of said sound information is displayed.

11. The recording and reproducing method as claimed in claim 9, wherein in said displaying, thumbnail images based on said image information associated with the respective said files of said sound information are displayed.

12. The recording and reproducing method as claimed in claim 9, wherein in said displaying, an image set as a representative image among said images based on one or a plurality of pieces of said image information associated with each of said files of said sound information is displayed.

13. The recording and reproducing method as claimed in claim 9, wherein said external operation is an operation of moving a cursor displayed together with said images by said display means so that the cursor indicates a desired said image by operating a predetermined operating element, and then setting said image as a selected object by operating said operating element.

14. The recording and reproducing method as claimed in claim 9, wherein said recording includes creating an image managing file including a filename of each of the first image information and a second image information, and the first position and the second position.

15. The recording and reproducing method as claimed in claim 9, wherein said recording includes storing sound information and associated image information in a same folder, a new folder being generated for each new sound information.

16. A portable type recording and reproducing device comprising:
a sound collector configured to collect external sound, and to output sound information corresponding to a result of sound collection;
a photographing device configured to photograph an outside of the device, and to output image information corresponding to a result of photographing;
a recorder configured to convert said sound information output from said sound collector to files in message units and recording said files on a predetermined recording medium, and to record said image information output from said photographing device on the recording medium in association with a corresponding file of said sound information as said sound information and image information is recorded in response to a user actuating a shutter button to record said image information, said recorder configured to associate a first image information with a first position in a sound information file and configured to associate a second image information with a second position in said sound information file, said recorder configured to record third image information after said sound information file is recorded, said recorder configured to associate the third image information with a third position in the sound information file based on user input;
a display device configured to display images based on said image information associated with said sound information file, said display device configured to display information on at least three different levels, and said display device simultaneously displaying a name of a level currently being displayed and level content, the names of types of levels including a folder level, a message level, and a bookmark level, folder level content including a plurality of message folders, and message level content including a plurality of bookmarks stored in the message folder; and a reproducer configured to reproduce said sound information file associated with said image selected by a predetermined external operation among said images displayed by said display device, said reproducer configured to reproduce said sound information file from the first position when the first image information is selected, to reproduce said sound information file from the second position when the second image information is selected, and to reproduce said sound information file from the third position when the third image information is selected.

17. The recording and reproducing device as claimed in claim 16, wherein said recorder is configured to create an image managing file including a filename of each of the first image information and a second image information, and the first position and the second position.

* * * * *